Patented Dec. 24, 1946

2,413,278

UNITED STATES PATENT OFFICE 2,413,278

BACTERIOLOGICAL PROCESS FOR TREATMENT OF FLUID-BEARING EARTH FORMATIONS

Claude E. Zobell, La Jolla, Calif., assignor to American Petroleum Institute, New York, N. Y., a corporation of the District of Columbia, and dedicated to the public throughout the world by said American Petroleum Institute No Drawing. Application March 17, 1944, Serial No. 527,010

4 Claims. (Cl. 195—1)

This invention relates to an improved process for increasing or facilitating the recovery of valuable fluids from fluid-bearing earth formations. More particularly, the invention relates to introducing bacteria into subterranean formations for the purpose of beneficially influencing the factors which control the quantity of valuable fluids which can be recovered from the formations or which control the facility with which such fluids are recoverable. The invention is primarily concerned with increasing or facilitating the recovery of valuable petroleum products from oil- or gas-bearing formations in the earth, but it is also applicable to the recovery of other fluids such as water or non-hydrocarbon gases from subterranean formations.

There are several factors which are known to influence the amount of valuable fluids which can be recovered from subterranean formations or the facility with which those fluids may be recovered. One of the most important of these factors is the porosity of the formation. Such fluids are customarily recovered through wells extending into the formation from the surface of the earth and it is obvious that the fluid can flow to the wells more readily through a porous formation. Another factor which influences the amount of oil which can be recovered from a formation is the extent to which oil adsorbed in calcareous materials in the formation can be liberated. It has been demonstrated that magnesium carbonate which has been saturated with crude oil may retain as much as fifty gallons of crude oil per ton of magnesium carbonate, which oil cannot be replaced by water. The crude oil adsorbed in magnesium carbonate is held so tenaciously that the equivalent of thirteen gallons of crude oil per ton of magnesium carbonate remain adsorbed after thorough leaching with ether.

The extent to which fluids will flow through a subterranean formation of given porosity is also influenced by the magnitude of surface tension values. If the surface tension values in the formation are high there is greater frictional resistance to flow of fluids through the formation than would be the case if those surface tension values were relatively low. The viscosity of liquids also has considerable bearing on their freedom to flow through porous formations. The pressure differential which exists between a producing well and zones spaced from the well in the formation is perhaps one of the most important factors in determining the rate or extent of flow of fluid to the producing well.

Several procedures have heretofore been resorted to in efforts to favorably influence one or more of the factors above enumerated. Attempts have been made to use explosives in that portion of a well extending into the producing formation in the hope that fractures could be created in the formation which would facilitate the flow of fluids to the well. However, the impossibility of controlling the direction or extent of such fractures and the ever-present hazard of rupturing the cap rock have made this procedure impractical. Some success has been achieved from procedures involving the introduction of gas or water under pressure into the formation at a point or points remote from the producing well and causing such gas or water to flow toward the producing well. The field of utility of these so-called gas and water "drives" has been found to be limited and they have not proven economically practical except in certain types of formations. Dissolution of calcareous materials in the formation adjacent a well by means of acid introduced through the well has given advantageous results which justify the procedure but the activity of the acid has been limited to a relatively small zone immediately surrounding the well. These various procedures which have heretofore been proposed or used do not and cannot advantageously influence all of the factors which bear on the extent or facility of recovery of valuable fluids from subterranean deposits.

According to my invention, a subterranean formation is inoculated with bacteria which are capable of beneficially influencing the factors which control the extent or facility with which fluids can be recovered from the formation. The bacteria are responsible for the production of acids or acidic substances from organic matter through a process of reduction of sulfates in the formation, and those acids or acidic substances attack and dissolve calcareous materials of the formation. The dissolution of the calcareous materials increases the porosity of the formation and effects release of fluids which had been adsorbed in the calcareous materials. Carbon dioxide also is formed and to the extent that this gas is not adsorbed in liquids present in the formation it is effective to increase the gas pressure. The bacteria also produce detergents or surface-active substances which effect release of adsorbed oil from sand and other non-calcareous material and reduce surface tension values in the formations to thereby provide what might be termed lubrication for the flow of fluids through the formation. There is basis for the belief that high molecular weight hydrocarbons are converted into hydrocarbons of lower molecular weight with a resulting decrease in viscosity and an increase in ability to flow through the formation.

One of the primary objects of my invention is to inoculate subterranean formations with bacteria for the purpose of increasing or facilitating the recovery of valuable fluids therefrom.

A more specific although important object of my invention is to increase or facilitate the recovery of petroleum oil and gas from oil and gas horizons by the introduction of bacteria into those horizons.

A further object of the invention is to increase the porosity of subterranean formations by the introduction of bacteria which function to effect dissolution of calcareous materials in the formations.

Still another object of the invention is to increase and facilitate the recovery of valuable fluids from subterranean formations by introducing bacteria which function to effect release of fluids adsorbed in the formation.

Still another object of the invention is to increase or facilitate the recovery of valuable fluids from subterranean formations by the introduction of bacteria which function to produce detergents or surface-active substances thus facilitating the release and flow of such fluids through the formation.

Another object of the invention is to increase the gas pressure within subterranean formations by introducing into the formations bacteria which function to produce carbon dioxide.

A further object of the invention is to increase the ability of petroleum oils to flow through oil horizons by reducing the viscosity of the oils through the action of bacteria which convert high molecular weight hydrocarbons into hydrocarbons of lower molecular weight.

Further objects and advantages of the invention will be apparent from the following detailed description.

The bacteria which are suitable for carrying out my invention are not yet described in the literature. They belong to the Desulfovibrio genus. Their position within this genus has not been definitely ascertained, and it appears probable that several closely related members of the genus are involved. The bacteria more nearly resemble *Desulfovibrio aestuarii* than any other organisms described in the literature. They require water for their growth and activity. Certain types of the bacteria require saline conditions for their growth. These types grow and are active in aqueous salt solutions and although most of my observations have been made in solutions ranging between 25,000 and 125,000 parts per million of salt, they have been found to tolerate salinities as high as 300,000 parts per million. The bacteria resemble *Vibrio thermodesulfuricans* (*Sporovibrio desulfuricans*) in their ability to tolerate high temperatures.

The bacteria are strict anaerobes. They should be cultured in absence of light. Sunlight and other ultraviolet radiations are inimical to their growth. They are capable of growing in the presence of crude oil, utilizing sulfates as a hydrogen acceptor. Presumably impurities in the crude oil provide for the mineral and nitrogen requirements of the bacteria. They preferentially attack certain nitrogenous and waxy constituents of crude oil although it has been demonstrated that they can assimilate pure hydrocarbons.

The bacteria having salinity requirements have been isolated from cores of limestone-sulfur-anhydrite formations taken from wells of the Freeport Sulfur Company at Grand Ecaille, Louisiana. The limestone-sulfur-anhydrite formation from which the cores were taken lies at a depth of approximately 1530 feet. Cultures of the bacteria having salinity requirements have also been obtained from marine muds taken from the floors of the Pacific Ocean and the Gulf of California, in some instances from water depths as great as 6,000 feet. All deep sea samples so far taken from the Pacific Ocean were taken between 117° and 122° west longitude and between 31° and 35° north latitude. The Gulf of California samples were collected between Guaymas and La Paz, Mexico, at about 110° west longitude and 25° north latitude. Mud from Mission Bay and Sorrento Slough (both in the vicinity of San Diego, California) have also yielded good cultures. Types of the bacteria which are not salt tolerant have been isolated from mud taken from the Chicago Drainage Canal at Chicago, Illinois.

The name *Desulfovibrio hydrocarbonoclasticus* has been assigned to these bacteria. That name is used in this specification and in the claims. The name *Desulfovibrio halohydrocarbonoclasticus* is used to designate those types of the *Desulfovibrio hydrocarbonoclasticus* which have salinity requirements and this name is also used in this specification and in the claims.

Cultures of *Desulfovibrio hydrocarbonoclasticus* may be prepared in various ways.

*Example 1*

One method which I have found to be convenient is to prepare an aqueous brine solution containing from 3% to 30% of sodium chloride. The salinity of the brine should roughly correspond to the salinity of the subterranean formation which is to be inoculated with the bacteria culture. To the brine I add 1.0% of calcium sulfate ($CaSO_4$), 1.0% of calcium carbonate ($CaCO_3$), 1.0% of calcium lactate ($Ca(C_3H_5O_3)_2$), and 0.1% ferrous ammonium sulfate $$(NH_4)_2SO_4.FeSO_4.6H_2O$$

This solution is then boiled to exclude atmospheric oxygen. After cooling the solution, I add to it any of the source materials for bacteria having salinity requirements which I have mentioned above. After introduction of the bacteria source material the solution is maintained in any air-tight container. A glass bottle provided with a glass stopper is suitable or any other container may be used by providing an air-excluding layer of paraffin wax to cover the upper surface of the liquid. The incubation should be carried on in darkness for several days at a temperature between 70° F. and 180° F. The incubation temperature should correspond at least approximately to the previously ascertained temperature of the subterranean formation which is to be inoculated with the culture.

In some instances, I have added 0.1% of either ascorbic acid ($C_5H_8O_6$) or sodium formaldehyde sulfoxylate ($NaHSO_2.HCHO.2H_2O$) to the above culture medium to lower the oxidation-reduction potential.

*Example 2*

Instead of the solution of Example 1, I may use a medium composed of the following constituents:

| | | |
|---|---|---|
| Sea water | ml | 1000.0 |
| Ammonium phosphate ($(NH_4)_2HPO_4$) | gm | 0.1 |
| Ferrous sulfate ($FeSO_4.7H_2O$) | gm | 0.1 |
| Potassium phosphate ($KH_2PO_4$) | gm | 0.2 |
| Calcium sulfate ($CaSO_4.2H_2O$) | gm | 50.0 |
| Calcium carbonate ($CaCO_3$) | gm | 40.0 |
| Calcium lactate ($Ca(C_3H_5O_3)_2$) | gm | 5.0 |
| Sodium chloride ($NaCl$) | gm | 60.0 |

This medium is used in the manner described in Example 1.

Example 3

Another procedure which I have found suitable for isolation of *Desulfovibrio halohydrocarbonoclasticus* and the preparation of a culture is to make a water paste of plaster of Paris $$((CaSO_4)_2.H_2O)$$

and calcium carbonate ($CaCO_3$) and to impregnate this paste with mineral oil and brine. The paste is also impregnated with iron-by-hydrogen which serves the dual purpose of reducing the oxidation-reduction potential and acting as an indicator for hydrogen sulfide formation. Any of the source materials for bacteria having salinity requirements mentioned above may then be added to the paste and a layer of molten paraffin wax added to exclude atmospheric oxygen. The salinity of the brine used in the preparation of this medium should correspond roughly to the salinity of the formation in which the bacteria are to be used. This medium may also undergo an incubation period of several days in darkness at a temperature of between 70° F. and 180° F., temperature of incubation being approximately that which exists in the subterranean deposit for which the culture is being developed. If it is desired to promote the growth of sulfate-reducing bacteria which cannot assimilate hydrocarbons, I find it advisable to add a little organic matter such as a peptone or a lactate to the medium.

After a few days incubation of any of the culture mediums of the above examples at a temperature within the range mentioned, there is evidence that the calcium carbonate is being dissolved and that the calcium sulfate is being attacked. It will be found that carbon dioxide is being liberated and if the medium is covered with paraffin wax the gas pressure slowly forces the layer of wax upwardly in the container. In the case of the medium of Example 3 it will be found that the mineral oil which was used in impregnating the paste is being released from the medium. When these conditions exist the culture is ready for introduction into an inoculating medium for inoculating a subterranean formation.

The bacteria cultures obtained by the procedure of any of the foregoing examples should be introduced into an inoculating medium or carrier to be used in inoculating the subterranean formation. A suitable inoculating medium or carrier may be prepared from the following constituents:

| | |
|---|---|
| Sea water _____ ml__ | 750 |
| Tap water _____ ml__ | 250 |
| Potassium phosphate ($K_2HPO_4$) _____ gm__ | 0.2 |
| Magnesium sulfate ($MgSO_4.7H_2O$) _____ gm__ | 0.2 |
| Ammonium chloride ($NH_4Cl$) _____ gm__ | 0.1 |
| Sodium sulfate ($Na_2SO_4$) _____ gm__ | 1.0 |
| Sodium sulfite ($Na_2SO_3$) _____ gm__ | 0.5 |
| Calcium carbonate ($CaCO_3$) _____ gm__ | 0.2 |
| Ferrous ammonium sulfate $((NH_4)_2SO_4.FeSO_4.6H_2O)$ _____ gm__ | 0.1 |
| Ascorbic acid ($C_5H_8O_6$) _____ gm__ | 0.1 |
| Sodium lactate ($NaC_3H_5O_3$) _____ gm__ | 3.0 |

The reaction of the medium is adjusted to pH 7.0 by the addition of sodium hydroxide or hydrochloric acid as required. Sodium formaldehyde sulfoxylate or sodium sulfide may be substituted for the ascorbic acid for reducing the oxidation-reduction potential. Sodium citrate, sodium succinate or the salts of similar organic acids may be substituted for sodium lactate. The salinity of the medium should be adjusted to approximately that of the reservoir fluid into which the culture is to be introduced by the addition of sodium chloride, or preferably brine from the reservoir fluid can be substituted for sea water in the above formula. A culture isolated according to Example 1, 2 or 3 is then added to the inoculating medium.

Examples 1 to 3 above have reference to the isolation of *Desulfovibrio halohydrocarbonoclasticus*, that is the types having salinity requirements. The inoculating medium above is also restricted in its use to *Desulfovibrio halohydrocarbonoclasticus*. These are the more important of the bacteria for the reason that brine is present in many of the subterranean oil-bearing formations. The bacteria mentioned above which are not salt tolerant may be isolated by substituting fresh water for the brine solutions or otherwise eliminating the salt from the mediums of Examples 1 to 3. Inoculating mediums of these bacteria may be prepared by using fresh water instead of sea water or brine in the inoculating medium described above.

The subterranean formation may be inoculated with the bacteria by any procedure found most convenient and my invention is not limited to any particular method of introduction. The inoculating medium may be introduced into the formation through an existing well by means of a dump bailer or the culture may be pumped into the well. Any of the procedures which have been found practical for the introduction of acids into subterranean formations may be used. The cultures may also be introduced into formations with brine or water which is being injected into a subterranean formation for the purpose of a water drive.

I have demonstrated the ability of the bacteria to dissolve calcium carbonate and magnesium carbonate, including limestone and dolomite. Acids or acidic substances are formed during sulfate reductions. So far as is now known, carbon dioxide is always produced and this unites with water to form carbonic acid which converts the insoluble magnesium or calcium carbonates into soluble or unstable bicarbonates. There is evidence that the bacteria oxidize complex organic matter to form certain organic acids, probably acetic acid, propionic acid and butyric acid. These organic acids react with the calcium carbonate or magnesium carbonate to yield organic salts, carbon dioxide and water.

It has also been found that detergents or surface-active substances are produced by the bacteria. The identity of these detergents is not presently known. They may be the fatty acids mentioned above as resulting from the partial oxidation of organic matter or they may be sulfonated higher alcohols or esters.

Some of the sulfate is apparently reduced to sulfur, while some is further reduced to hydrogen sulfide. The hydrogen sulfide which is produced is not generally regarded as an acid and is not as acidic as the sulfate ion which is reduced, but it is effective to assist in the dissolution of the calcareous materials. This appears to be due to the fact that in subterranean formations many of the sulfates are insoluble and hence have no direct effect on the hydrogen-ion concentration or the dissolution reaction.

Unsaturated hydrocarbons are adsorbed and retained more tenaciously by sedimentary materials in producing horizons than are the saturated hydrocarbons. The sulfate-reducing bacteria appear to preferentially attack the unsaturated hydrocarbons and it further appears that the adsorbed unsaturated hydrocarbons are attacked more readily than those which are free. There are indications that the adsorbed unsaturated hydrocarbons are split at the site of the double bond with liberation from the sedimentary material of lighter, more mobile hydrocarbons. There is also evidence that the bacteria split saturated long chain hydrocarbons into shorter chains with a resulting increase in the ability of the hydrocarbons to flow through the formation.

It is recognized that the chemical reactions induced by the bacteria are highly technical and that the precise nature of the compounds resulting from the reactions is not thoroughly understood. The foregoing explanation is necessarily somewhat general and is given only for the purpose of setting forth my present belief regarding the manner in which the bacteria function. The nature of the reactions and the circumstances under which they are carried out render it extremely difficult to make analytical determinations. For these reasons, the invention should not be construed as limited to the theories which I have outlined above regarding the reactions and the resulting compounds. Irrespective of whether those theories are correct, I desire to call attention to certain observed results of the use of the bacteria. The ability of the bacteria to dissolve calcium carbonate and magnesium carbonate and to release oil adsorbed in the carbonates has been demonstrated. The production of gaseous carbon dioxide during the dissolution of the carbonates has been proven. When the bacteria are cultivated in a liquid medium in the absence of adsorbents such as sand, the surface tension of the medium has been reduced, presumably by the production of detergents or surface-active substances. When the bacteria are cultivated in a liquid medium in the presence of adsorbents such as sand, the surface tension of the fluid medium is not perceptively reduced, presumably for the reason that the detergents are adsorbed by the adsorbent. When the adsorbents present in the medium contain oil, the oil is released from the adsorbent. Athabaska tar sands from the Athabaska region of Canada have been found to release oil when subjected to contact with a medium of the bacteria. The bacteria attach themselves so tenaciously to solid surfaces that they cannot be flushed away by the ordinary flow of fluids in a formation.

The bacteria attack hydrocarbons of high molecular weight but molecules having less than ten carbon atoms are not attacked. For example, hentriacontane ($C_{31}H_{64}$) is attacked but the bacteria have no converting action on octane ($C_8H_{18}$) or hexane ($C_6H_{14}$). In the process of decomposition the higher molecular weight hydrocarbons are converted into successively smaller molecules. Since molecules smaller than decane are not attacked and since methane has been detected during decomposition of higher molecular weight hydrocarbons, it seems probable that the decomposition is a hydrocarbon-splitting action.

There are indications that the bacteria may continue to grow indefinitely. The extent to which their proliferation causes them to spread through the formation or the rate of such spreading has not been definitely observed, but in the laboratory it has been found that they will grow through a one-half inch thickness of unglazed porcelain within a few hours and that they will permeate tightly packed sand for relatively long distances in a short time.

Unsaturated and long-chain hydrocarbons are slowly assimilated by the bacteria, although the organisms preferentially assimilate more complex organic matter. The assimilation of the hydrocarbons is a bacterial oxidation reaction and is self-limiting for the reason that the oxidizing activities of the organisms are inhibited by hydrogen-ion concentrations lower than pH 6.0, and the oxidation of relatively small quantities of hydrocarbons are required to produce sufficient carbon dioxide in solution to lower the pH to 6.0. For the foregoing reasons, it appears probable that the amount of hydrocarbons in a formation which are actually assimilated by the bacteria is negligible.

The bacteria require water for their growth and activity, but it appears that capillary or connate water is always available in formations in sufficient quantity. Oxidized sulfur compounds such as sulfates, sulfites, or thiosulfates appear to be essential for the growth of the bacteria and for this reason it would not appear to be advisable to introduce the bacteria into subterranean deposits in which all of the sulfates or other oxidized sulfur compounds have been reduced. By preparing the bacteria cultures in any of the manners which I have outlined above, they may be acclimatized to grow and exhibit activity at temperatures as high as 180° F. Activity of the bacteria has not been observed at temperatures higher than 190° F., so the bacteria should not be expected to perform their intended functions in formations in which the temperature substantially exceeds 180° F.

From the foregoing it will be seen that my invention favorably influences the several factors which control the extent or facility of recovery of valuable fluids from subterranean formations. Much of the foregoing discussion has had particular reference to the recovery of hydrocarbons from formations containing the same. It is in this field that all of the enumerated advantages of the invention find utility. However, it will be obvious that the increase in porosity of the formation, the production of surface tension depressing agents, and the increase in gas pressure in the formation are advantageous in the recovery of other fluids.

Having thus described my invention, I claim:

1. The method of treating a fluid-bearing earth formation to facilitate or increase the recovery of fluids therefrom which comprises subjecting the formation to the action of *Desulfovibrio hydrocarbonoclasticus*.

2. The method of treating a subterranean formation to facilitate or increase the recovery of valuable fluids therefrom which comprises subjecting the formation to the action of *Desulfovibrio hydrocarbonoclasticus*.

3. The method of treating a hydrocarbon-bearing earth formation to facilitate the recovery of hydrocarbons therefrom which comprises subjecting the formation to the action of *Desulfovibrio hydrocarbonoclasticus*.

4. The method of increasing or facilitating the recovery of oil from a subterranean oil-bearing formation which comprises subjecting the formation to the action of *Desulfovibrio halohydrocarbonoclasticus*.

CLAUDE E. ZOBELL.